(12) United States Patent
Barber et al.

(10) Patent No.: US 6,173,292 B1
(45) Date of Patent: Jan. 9, 2001

(54) DATA RECOVERY IN A TRANSACTIONAL DATABASE USING WRITE-AHEAD LOGGING AND FILE CACHING

(75) Inventors: Ronald Jason Barber; David Mark Herbert; Chandrasekaran Mohan; Amit Somani, all of San Jose; Steven John Watts, Morgan Hill; Markos Zaharioudakis, San Jose, all of CA (US)

(73) Assignee: International Business Machines Corporation, Armonk, NY (US)

( * ) Notice: Under 35 U.S.C. 154(b), the term of this patent shall be extended for 0 days.

(21) Appl. No.: 09/034,521

(22) Filed: Mar. 4, 1998

(51) Int. Cl.[7] .................................................. G06F 12/00

(52) U.S. Cl. ................... 707/200; 707/1; 707/5; 707/8; 707/201; 707/202; 707/203; 707/204; 707/205

(58) Field of Search ................... 707/200, 201, 707/202, 204, 1, 8, 205; 700/5; 711/118, 133

(56) References Cited

U.S. PATENT DOCUMENTS

| | | | |
|---|---|---|---|
| 4,480,304 | 10/1984 | Carr et al. | 714/14 |
| 4,868,744 | 9/1989 | Reinsch et al. | 707/200 |
| 4,945,474 | 7/1990 | Elliott et al. | 707/200 |
| 5,043,866 | * 8/1991 | Myre, Jr. et al. | 707/202 |
| 5,170,480 | 12/1992 | Mohan et al. | 707/207 |
| 5,280,611 | 1/1994 | Mohan et al. | 707/8 |
| 5,327,556 | * 7/1994 | Mohan et al. | 707/8 |
| 5,333,303 | 7/1994 | Mohan | 707/8 |
| 5,437,026 | 7/1995 | Borman et al. | 707/202 |
| 5,455,946 | 10/1995 | Mohan et al. | 707/202 |
| 5,465,328 | 11/1995 | Dievendorff et al. | 395/182.13 |
| 5,504,883 | 4/1996 | Coverston et al. | 707/1 |
| 5,524,205 | 6/1996 | Lomet et al. | 714/16 |
| 5,544,359 | 8/1996 | Tada et al. | 707/202 |
| 5,546,579 | * 8/1996 | Josten et al. | 707/8 |
| 5,561,795 | * 10/1996 | Sarkar | 707/202 |
| 5,561,798 | 10/1996 | Haderle et al. | 707/1 |
| 5,574,897 | 11/1996 | Hermsmeier et al. | 707/1 |
| 5,581,750 | 12/1996 | Haderle et al. | 707/1 |

(List continued on next page.)

FOREIGN PATENT DOCUMENTS

0 295 424 B1    5/1988    (EP) .

OTHER PUBLICATIONS

IEEE publication, "Disk Caching in Large Database and Timeshared Systems"by Barbara Zivkov and Alan Smith, pp. 184–195, Jan. 1997.*

A. Reuter, "C. Maintenance of The Log Bus", IEEE Computer Society, pp. 353–354, Jul. 1, 1980.

A. Reuter, "The Basic Idea", IEEE Computer Society, pp. 350–351, Jul. 1, 1980.

D.E. Bezviner, et al. "Scheme For reduced Logging For Forward–Recoverable Databases", pp. 9–13, 1994.

*Primary Examiner*—Thomas G. Black
*Assistant Examiner*—Diane Mizrahi
(74) *Attorney, Agent, or Firm*—Khanh Q. Tran; Altera Law Group, LLC

(57) ABSTRACT

A method, apparatus, and article of manufacture for providing transaction control for a computer-implemented database management system. The database management system manages one or more databases, wherein each of the databases contains one or more documents and each document contains one or more objects. The database management system also supports a file cache for those databases. A transaction control system provides transaction control for the databases, documents, and objects managed by the database management system, wherein the transaction control system monitors and controls the file cache to ensure that modified objects are stored on a data storage device in manner that reflects an accurate status for a log file maintained by the transaction control system.

18 Claims, 10 Drawing Sheets

U.S. PATENT DOCUMENTS

| | | | |
|---|---|---|---|
| 5,613,113 | 3/1997 | Goldring | 707/202 |
| 5,625,820 | 4/1997 | Hermsmeier et al. | 702/202 |
| 5,640,561 | 6/1997 | Satoh et al. | 707/202 |
| 5,666,514 * | 9/1997 | Cheriton | 711/144 |
| 5,778,388 * | 7/1998 | Kawamura et al. | 707/203 |
| 5,799,323 * | 8/1998 | Mosher, Jr. et al. | 707/202 |
| 5,933,838 * | 8/1999 | Lomet | 707/202 |
| 5,966,706 * | 10/1999 | Biliris et al. | 707/10 |

* cited by examiner

DATA RECOVERY IN A TRANSACTIONAL DATABASE USING WRITE-AHEAD LOGGING AND FILE CACHING

BACKGROUND OF THE INVENTION

1. Field of the Invention

The present invention generally relates to computer-implemented database management systems, and in particular, to a method for using write-ahead logging and file caching in a transaction control system to guarantee the integrity of the database management system.

2. Description of Related Art

Transaction control is well understood in the art and is often used to guarantee the integrity of transactional databases. Guaranteeing the integrity of databases in the face of concurrent execution of multiple transactions and various failures is a very important issue with enterprise databases. Indeed, many methods have been developed in the past to deal with these problems for enterprise databases.

Databases used with personal computer networks often lack such transaction control. Nonetheless, with the increasing use of personal computer networks there is a need to add transaction control to such databases. However, most such databases are not robust enough to easily accept the addition of transaction control. Moreover, such databases are not designed with the goal of someday adding such transaction control to them.

Thus, there is a need in the art for enhanced transaction control for databases used on personal computer networks. The present invention solves these and other problems, as discussed further herein.

SUMMARY OF THE INVENTION

To overcome the limitations in the prior art described above, and to overcome other limitations that will become apparent upon reading and understanding the present specification, the present invention discloses a method, apparatus and article of manufacture for providing transaction control for a computer-implemented database management system. The database management system manages one or more databases, wherein each of the databases contains one or more objects. The database management system also supports a file cache for those databases. A transaction control system provides transaction control for the databases managed by the database management system, wherein the transaction control system monitors and controls the file cache to ensure that modified objects are stored on a data storage device in manner that reflects an accurate status for a log file maintained by the transaction control system. An object of the present invention is to provide write-ahead logging for database management systems or file systems that support file caching. Another object of the present invention is to provide enterprise-database transaction control and recovery for database models that are complex in structure. Yet another object of the present invention is to provide transaction control for databases wherein the locations of objects within those databases migrate over time.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention comprises a transaction system for a database management system using write-ahead logging and file caching. More specifically, the present invention provides enhanced transaction control for the NOTES® product sold by Lotus Development Corporation, a wholly-owned subsidiary of IBM Corporation, the assignee of the present invention. One of the challenges of the present invention is that the NOTES® product was not designed with standard enterprise-database transaction control and recovery in mind.

A first problem is that the data model supported by the NOTES® product is very rich as compared to relational databases. An additional problem is the complex structure of databases constructed by the NOTES® product, wherein each database is a single file, so that it is self-describing, easily copied, and easily usable across different platforms. Still another problem is that some space within a database may be content paginated. while the rest of the space is comprised of byte-streams of variable object sizes, where, over time, there is often a migration of objects and byte-streams within each database as space occupied by pages get reallocated as byte-streams, and vice versa.

Nonetheless, the transaction control of the present invention provides an overall recovery approach for the NOTES®) product and its databases. The present invention is based upon the ARIES (Algorithm for Recovery and Isolation Exploiting Semantics) technology used in the DB2, MQSeries, and ADSM products sold by IBM Corporation and as described in C. Mohan, D. Haderle, B. Lindsay, H. Pirahesh, and P. Schwarz, "ARIES: A Transaction Recovery Method Supporting Fine-Granularity Locking and Partial Rollbacks Using Write-Ahead Logging," ACM Transactions on Database Systems, Vol. 17, No. 1, March, 1992, which publication is incorporated by reference herein. However, the ARIES technology has been significantly modified to cope with the uniqueness and richness of the NOTES® product.

Hardware Environment

Figure 1:
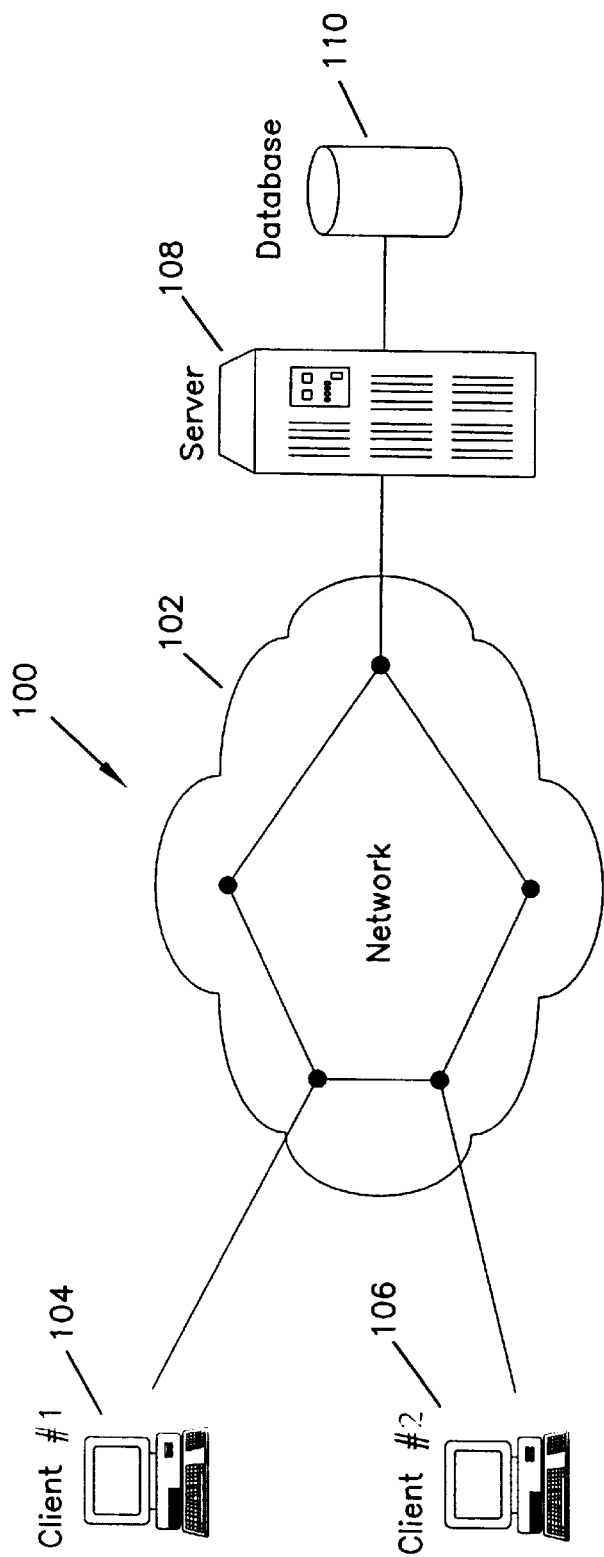
FIG. 1 schematically illustrates the environment of the preferred embodiment of the present invention.

FIG. 1 schematically illustrates the environment of the preferred embodiment of the present invention, and more particularly, illustrates a typical distributed computer system 100 using a network 102 to connect one or more clients 104 and 106 to a server 108 having one or more direct access storage devices (DASDs) 110. In a preferred embodiment, the server 108 executes the NOTES® product and the DASD 110 stores one or more NOTES® databases, although other database management systems and databases could be substituted therefor without departing from the scope of the present invention. A typical combination of resources may include clients 104 and 106 that are implemented on personal computers or workstations, and servers 108 that are implemented on personal computers, workstations, minicomputers, or mainframes. The network 102 may comprise networks such as LANs, WANs, SNA networks, and the Internet.

The present invention is generally implemented in one or more computer programs (for example, the NOTES® product and its databases) that are executed by the clients 104 and 106 and/or the server 108 to perform the desired functions as described herein. Generally, the computer programs are tangibly embodied in and/or readable from a device, carrier, or media, such as a memories, data storage devices, and/or remote devices coupled to the computer via data communications devices. Thus, the present invention may be implemented as a method, apparatus, or article of manufacture using standard programming and/or engineering techniques to produce software, firmware, hardware, or any combination thereof. The term "article of manufacture" (or alternatively, "computer program carrier") as used herein is intended to encompass any device, carrier, or media that provides access to instructions and/or data useful in performing the same or similar functionality. Of course, those skilled in the art will recognize many modifications may be made to this configuration without departing from the scope of the present invention.

Notes Server

Figure 2:
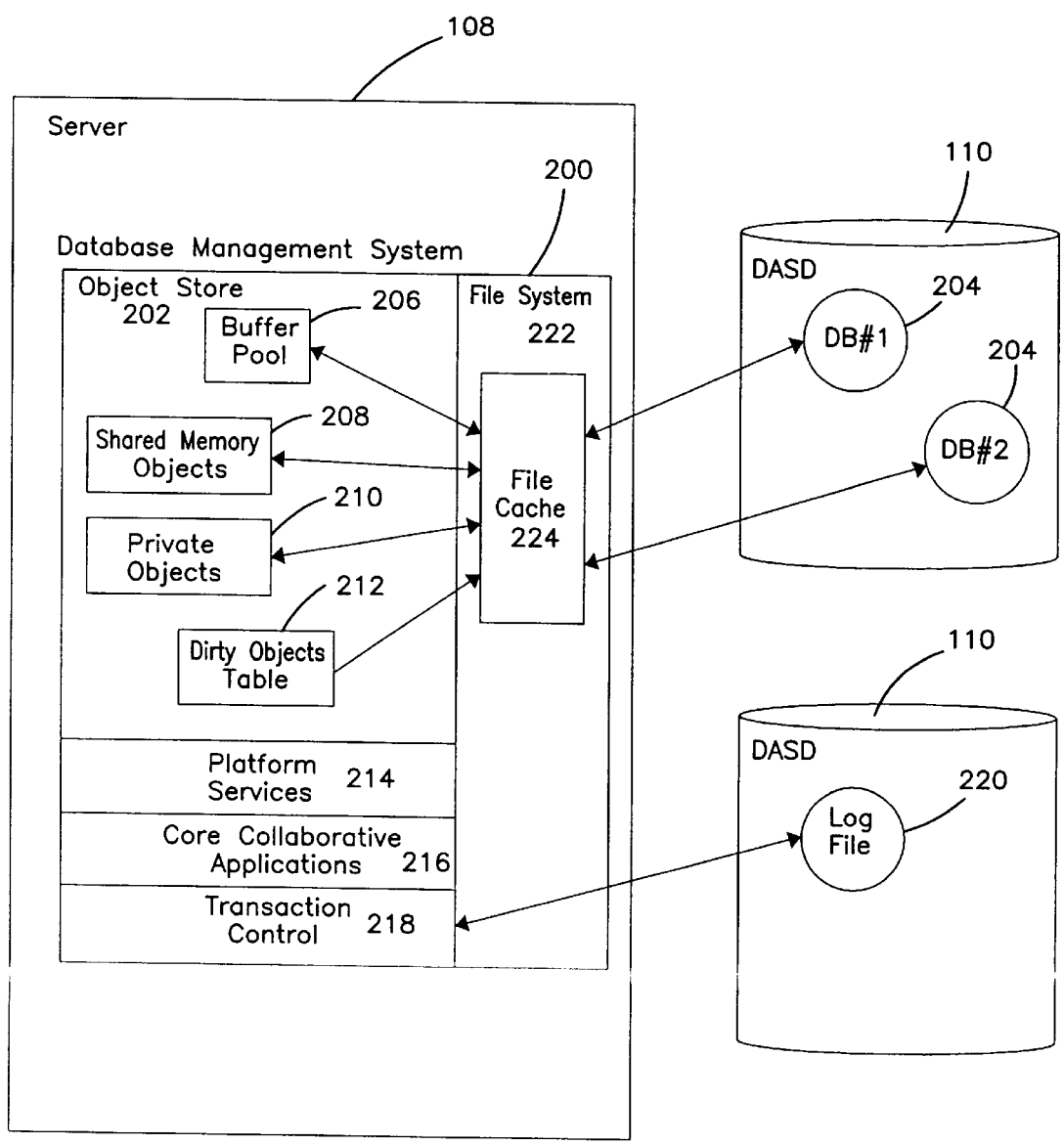
FIG. 2 illustrates the architecture of the NOTES® server according to the present invention.

FIG. 2 illustrates the architecture of the NOTES® server 108 according to the present invention. The NOTES® server 108 generally can be described as a database management system (DBMS) 200 having a set of layers or components, each of which provides different functionality. This layered view underscores the tight integration of core services and functions.

One component is the document-centric object store 202. The object store 202, also known as the NOTES® Storage Facility (NSF), is a database engine designed from its inception to support distributed and asynchronous collaborative work. Each document, or "note", is a compound structure of mixed data types comprised of items or fields and other elements that can be arbitrarily modified and extended. A document may contain text, rich text, binary large objects (e.g., attachments, etc.), encryption keys, doclinks, and so on. Each NOTES® database 204 contains a collection of one or more documents, and includes metadata comprising organizing structures for display, security, retrieval and access rights to the documents. These various elements are managed in the memory of the server 108 as a buffer pool 206, shared memory objects 208, and private objects 210.

Another component comprises platform services 214 that are logically distinct from, but tightly bound to, the object store 202. The platform services 214 include modules such as security, replication, routing, compute, view indexing, and document editing/rendering. Each module within the platform services 214 is self-contained with common interfaces to each other and the object store 202. As a result, new modules can be introduced into the platform services 214 or existing ones swapped out, for example, as the needs of customers require the adoption of new or standards-based components.

Another component comprises core collaborative applications 216 that are coordinated by supporting system applications. The core collaborative applications 216 include modules such as mail, calendar, scheduling, discussions, document management, Web Navigator, and so on, and are the first level of services directly visible to end-users. As standard NOTES® applications, they can be modified and extended by developers, but usually have a dependency on kernel routines within the DBMS 200. System applications control and monitor these and all other applications. Third-party application modules also fit into this component.

Another component comprises transaction control 218 and a log file 220 that support file caching and write-ahead logging for enhanced enterprise-database transaction control and recovery. The transaction control 218 provides an overall logging and recovery mechanism based upon the ARIES (Algorithm for Recovery and Isolation Exploiting Semantics) technology described in C. Mohan, D. Haderle, B. Lindsay, H. Pirahesh, and P. Schwarz, "ARIES: A Transaction Recovery Method Supporting Fine-Granularity Locking and Partial Rollbacks Using Write-Ahead Logging," ACM Transactions on Database Systems, Vol. 17, No. 1, March, 1992, which publication is incorporated by reference herein. However, the transaction control 218 significantly modifies the ARIES technology to cope with the uniqueness and complexity of the NOTES® product.

Another component comprises file system 222, which is typically considered external to the NOTES® product, but could comprise either an interface or functionality within the NOTES® product. The file system 222 includes a file cache 224 that has a significant effect on the operation of the transaction control 218, as described in more detail below. The file cache 224 is useful when writes of a small number of bytes of data are done into the file system 222. It permits the operating system to perform batched I/Os an asynchronous fashion, thereby reducing the number of I/Os and improving the response time for the write I/O calls. However, in the prior art, when a DBMS allowed file caching, it did not guarantee data and file integrity with respect to recovery.

Documents

Figure 3:
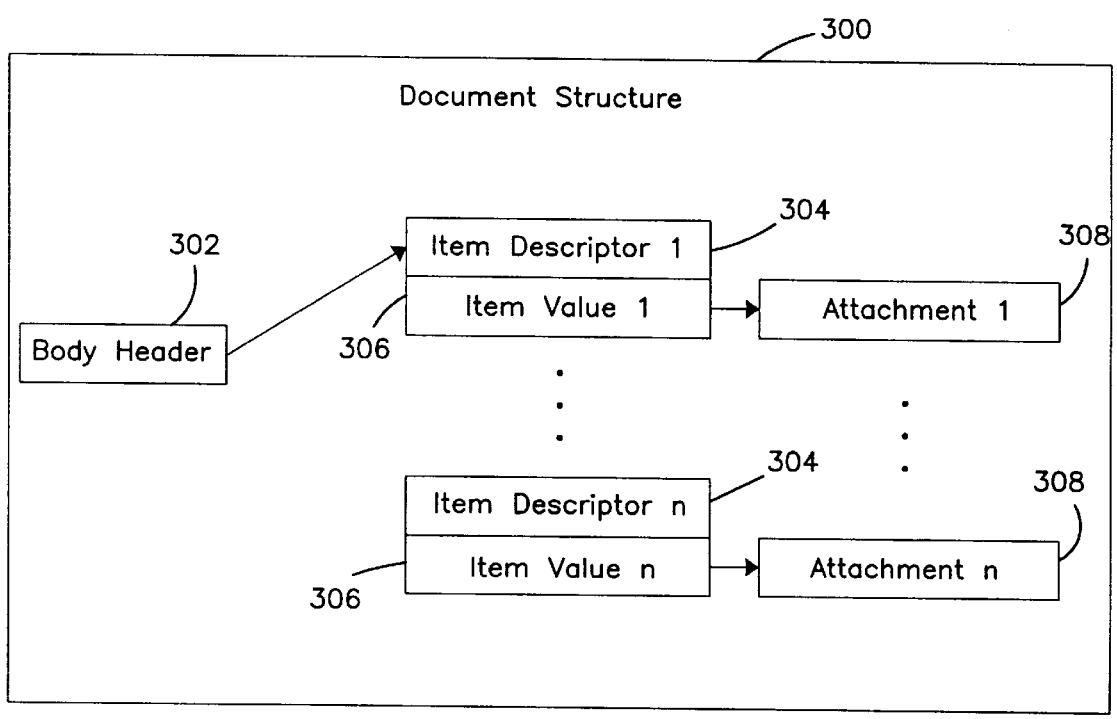
FIG. 3 illustrates the structure of a document as stored in the NOTES® server according to the present invention.

FIG. 3 illustrates the structure of a document 300 as stored in the NOTES® server 108 according to the present invention. Documents 300 are identified and located by NotesIDs (which are specific to a database 204) and UNIDs (which are universal across databases 204).

Compound documents 300 are the base objects in the object store 202, comprising an extensible set of structured data organized in a fielded containment hierarchy. The hierarchy includes a body header 302 that identifies a series of items comprising item descriptors (fields) 304 and item values (field values) 306, wherein some item values 306 may actually point to attachment objects 308. There can be any number of items, having any name, and any number of instances thereof The fields are typed and can be text, numeric, date/time, keyword, names, reader, author, rich text, etc. In addition, control information is maintained by each document 300 within meta-data fields. All structures are exposed for programmatic control through object-oriented languages such as LotusScript, Java or C++.

Transaction Control

To meet data recovery requirements, the transaction control 218 of the present invention records the progress of a transaction in a log file 220, and the actions of the transaction that cause modifications to recoverable objects. The log file 220 can be thought of as an ever-growing sequential file. The log file 220 becomes the source of ensuring either that the transaction's committed actions are reflected in. the associated database 204 in spite of various types of failures, or that its uncommitted actions are undone (i.e., rolled back). When the logged actions reflect an object's content, then those log file 220 records also become the source for reconstruction of damaged or lost databases 204.

The present invention uses a write-ahead logging (WAL) approach to recovery. The WAL protocol asserts that the log file 220 records representing modifications to objects in the database 204 must be stored on DASD 110 before the modified objects are allowed to replace the previous version of those objects in the database 204 on the DASD 110. Additionally, transaction status is stored in the log file 220 and no transaction can be considered complete until its committed status and all its log file 220 records are safely recorded on the DASD 110. Further, the present invention is able to monitor and control the file cache 224 to ensure that modified objects in the database 204 are stored on the DASD 110 in manner that reflects an accurate status for the log file 220.

Logging

Logging is performed by the transaction control 218 for every modification made by a transaction to an object. More specifically, a transaction is not allowed to modify the objects in the database 204 on the DASD 110 until at least an "undo" portion of a corresponding log file 220 record has been written to the log file 220. In addition, the transaction is not permitted to complete its commit processing until at least a "redo" portion of a corresponding log file 220 record has been written to the log file 220. These requirements allow a restart recovery method performed by the transaction control 218 to recover any transactions that completed successfully but did not store their modified objects to the database 204 on the DASD 110 prior to the failure.

For simplicity, it is assumed in the preferred embodiment that each log file 220 record describes the modifications performed to only a single object within a database 204, although alternative embodiments may make other assumptions. The redo portion of a log file 220 record provides information on how to redo modifications performed by the transaction and the undo portion of a log file 220 record provides information on how to undo modifications performed by the transaction.

Depending on the action performed, the redo/undo information may be recorded physically (e.g., before and after images of specific fields within the object) or operationally (e.g., add 5 to field 3 of object A). Operational logging permits high concurrency lock modes, which exploit the semantics of the operation performed on the object (e.g., the same field of an object could have uncommitted modifications from multiple transactions). These permit more concurrency than what is permitted by the strict executions property, which essentially says that modified objects must be locked for the commit duration.

During the restart recovery method, when the redo log file 220 record for such a modification is encountered, if the object is an earlier version than that reflected in the log file 220 record, then the transaction control 218 will need to apply this log file 220 record. At this point, the object should have the "old image" for this document. To perform the redo pass, the transaction control 218 builds an in-memory version of the items for the object, by extracting the modified/ inserted items from the log file 220 record and unchanged items for their "old" positions in the object. At this point, the transaction control 218 can store the reconstructed object in the database 204 on the DASD 110. The undo pass is handled in a similar fashion.

The log file 220 is usually stored on a stable, nonvolatile storage device, for example, DASD 110, although devices could also be used. Whenever log file 220 records are created, they are first stored in buffers of the transaction control 218 before being written to the log file 220 on the DASD 110. Only at certain times (e.g., at commit time) are the log file 220 records written (in sequence) to the DASD 110. This is called "forcing" the log file 220 records. In addition to forces caused by transaction and transaction control 218 activities, a background process may periodically force the log file 220 records as buffer space in the transaction control 218 is exhausted.

Log Sequence Numbers

Each log file 220 record is assigned a unique log sequence number (LSN) at the time the record is written to the log file 220. In a preferred embodiment, the LSNs comprise 8 byte values assigned in ascending sequence, although they can encompass any number of different values without departing from the scope of the present invention. The LSN is usually (but not always) a monotonically increasing value.

A number of different LSNs, including PageLSNs, RecLSNs, FCacheLSNs, TempFCacheLSNs, and ReDoLSNs, are used in the present invention, as described in more detail below:

A PageLSN (Page LSN) is an LSN associated with an object (or page) that reflects the most recent modification performed on the object.

A RecLSN (Recovery LSN) is a lower bound for an LSN value of the oldest log file 220 record for a modified object that is not yet stored in the file cache 224 or in the database 204 on the DASD 110. The RecLSN is used in determining a redo point in the log file 220 for the restart recovery method. The RecLSN is generally defined as an end-of-log LSN at the time the transaction control 218 receives notice that an object will become "dirty", (i.e., modified) prior to any logging for that modification.

The MinRecLSN (Minimum Recovery LSN) is the minimum value of all RecLSNs of the buffer pool 206, shared memory objects 208, and dirty objects table 212.

An FCacheLSN (File Cache LSN) is a minimum value for the RecLSNs of all objects that are suspected to be in the file cache 224, i.e., a minimum value for the RecLSNs of objects written to the file cache 224 since the last flush of the file cache 224. The FCacheLSN is stored in the memory of the server 108 for each database 204 opened by the file system 222.

A TempFCacheLSN (Temporary File Cache LSN) is used to temporarily hold a copy of the FCacheLSN during the flush of the file cache 224. As above, there is one TempFCacheLSN per database 204 opened by the file system 222.

A ReDoLSN is an LSN of the log file 220 record at which a redo pass as well as an analysis pass of the restart recovery method will begin. The ReDoLSN is calculated whenever a checkpoint record is written to the log file 220. The ReDoLSN is the minimum of the MinRecLSN, FCacheLSN and TempFCacheLSN.

The use of these LSNs during the logging of a database 204 is described in more detail below.

Dirty Objects Table

Shared memory objects 208 are stored at well known locations in the memory of the server 108. Hence, it is easy to obtain their RecLSNs.

However, for "private" objects 210, such as attachments 308, it is difficult for the transaction control 218 to determine their whereabouts in the memory of the server 108. Thus, such objects 210 must "publicize" their RecLSNs in some well known location, which can then be accessed when a checkpoint record is being created.

As an object is identified as one to be modified, thus becoming "dirty", an entry is made in the dirty objects table (DOT) 212 of the form (ObjectID and RecLSN), wherein the ObjectID uniquely identifies the location of the object across all databases 204. For simplicity, it is assumed that RecLSNs for "dirty" shared memory objects 208 are also maintained in the DOT 212. When the object is later passed to the file system 222 to be stored in the database 204 on the DASD I 10, the entry is removed from the DOT 212.

File Caching

However, there are some problems with computing the ReDoLSN in the manner described above. Due to the use of the file cache 224, once an object is written to the file system 222, there is no guarantee that it was stored in the database 204 on the DASD 110.

Consider the following examples. Assume that, at time t0, object P is stored in the buffer pool 206 with a PageLSN (P)=60. Object P is to be modified, so its RecLSN is set to 80 (the current end-of-log LSN) and a log file 220 record with LSN=80 is written to the log file 220 on the DASD 110. The PageLSN of object P is updated to 80. At time t1, the modifications are made to object P and object P is written to the file system 222 and stored in the file cache 224, which causes the transaction control 218 to set the MinRecLSN= infinity (i.e., its highest possible value). At time t2, the transaction control 218 writes a checkpoint record to the log file 220 on the DASD 110. At time t4, the DBMS 200 fails, while object P is still in the file cache 224 and before it has been flushed from the file cache 224 and stored in the database 204 on the DASD 110. Under these conditions, restart recovery will not redo the update with LSN=80. To prevent this situation, the transaction control 218 must track the state of the file cache 224.

The FCacheLSN is used to solve this problem. Thus, in the present invention, each database 204 opened by the file system 222 has an associated FCacheLSN. The FCacheLSN stores a conservative value which is the minimum RecLSN of all the objects of the database 204 that may exist in the file cache 224. The idea is to set the FCacheLSN of a database 204 to a value of infinity (i.e., the highest possible value) or some other value, whenever the contents of the file cache 224 are flushed to the associated database 204 stored on the DASD 110, and to set the FCacheLSN to a value comprising the minimum of either the current FCacheLSN or the RecLSN of an object, whenever the object is written to the file system 222. In addition, the DBMS 200 (either through the transaction control 218 or other means) ensures that a flush of the file cache 224 occurs every so often.

However, the above solution using the FCacheLSN is not complete. For example, if an object is written to the file system 222 and stored in the file cache 224 while a flush of the file cache 224 to the associated database 204 is being performed, then the FCacheLSN of the database 204 should not be set to infinity (i.e., the highest possible value) (or other value) at the end of the flush operation, because the object itself may not actually be flushed to the database 204 stored on the DASD 110.

In another example, assume that at time t0, the file cache 224 is empty. Thereafter, objects 1, 2, and 3 of a specified database 204 and having RecLSNs 100, 110, and 120, respectively, are modified and objects 1 and 3 are written to the file system 222 and stored in the file cache 224. Assume that at time t1, a flush of the file cache 224 begins, wherein MinRecLSN has the value 110. Assume that FCacheLSN is set to infinity (i.e., the highest possible value) just before flushing begins. Then, a subsequent checkpoint record will have ReDoLSN=110. Assume that the checkpoint occurs (and the checkpoint record is stored in the log file 220) before the flush completes. However, if there were a failure after the checkpoint record is written to the log file 220 stored on the DASD 110 but before the flush completes, object 1 with RecLSN=100 would not be recovered properly.

Setting FCacheLSN to infinity (i.e., the highest possible value) after the flush completes will not correct these erroneous result. For example, assume that the flush begins after objects 1, 2, and 3 are modified and after objects 2 and 3 are written to the file system 222 and stored in the file cache 224. In addition, assume that object 1 is written to the file system 222 and stored in the file cache 224 after the flush begins but before the flush ends. Finally, assume that the checkpoint record is written to the log file 220 after the flush completes and that the failure occurs after the checkpoint. This sequence still does not ensure that object 1 is stored in the database 204 on the DASD 110. At the checkpoint, MinRecLSN =infinity (i.e., the highest possible value) (because the "dirty" objects have been transferred to the file system 222) and FCacheLSN=infinity (i.e., the highest possible value) (because the flush completed). The checkpoint record would reflect an empty file cache 224, when in reality object 1 may never have been stored in the database 204 on the DASD 110.

The solution is to maintain a TempFCacheLSN (temporary file cache LSN) for each database 204 opened by the file system 222. Whenever an object for the database 204 is transferred to the file system 222, then the FCacheLSN associated with the database 204 is set to a value of the minimum of either the FCacheLSN or the RecLSN of the object. At the start of the flush, the TempFCacheLSN is set to the value of the associated FCacheLSN and the FCacheLSN is set to infinity (i.e., the highest possible value). At the completion of the flush, TempFCacheLSN is set to infinity (i.e., the highest possible value). At the checkpoint, the ReDoLSN is set to a value of the minimum of the RecLSNs in the dirty objects table 212, the RecLSNs of pages in the buffer pool 206, the FCacheLSN, or the TempFCacheLSN. These steps will ensure that the correct ReDoLSN value is stored in the checkpoint records.

Restart Recovery

The transaction control 218 performs a restart recovery after a failure of some kind and usually only in response to an operator entry (although automated recovery may be used as well). This restart recovery method comprises at least three passes.

During an initial analysis pass, the transaction control 218 first scans the log file 220 records, starting from the restart redo point as determined from the last checkpoint record to the end of the log file 220. During this scan, information is gathered about objects that were potentially more up to date in the file cache 224 or elsewhere in the memory of the server 108 than in the database 204 stored on the DASD 110. In addition, information is gathered about transactions that were in progress at the time of the failure. The analysis pass also provides the list of transactions to be rolled back.

One problem with the database 204 is that space therein maybe re-mapped from LSN to non-LSN structures and vice versa. Thus, modifications reflected in log file 220 records could be applied to locations in the database 204 that are currently occupied by objects other than the object the modifications are intended for.

In addition, all the space in a database 204 (or file) is divided into fixed size granules (e.g., each 256 bytes), and storage is allocated in terms of integer multiples of granules. Log file 220 records contain granule information for the updated objects, e.g., a list of granules affected for that log file 220 record. However, unlogged objects that move into granules previously used by logged objects will be corrupted during a redo pass of the restart recovery method.

To solve the above-identified problems, the transaction control 218 creates a granule avoidance list (GAL) during the analysis pass, wherein the GAL comprises a plurality of entries, each of which comprise a granule range and LSN pair. Entries are created, for example, when a granule allocation log file 220 record is encountered, wherein later allocations replace earlier allocations for the same granules. Alternatively, the GAL could also be maintained by tracking deallocations. Thereafter, logged modifications that affect any granule listed in the GAL are skipped, either partially or in their entirety, if their LSN is less than the LSN of the GAL entry.

After the analysis pass, the transaction control 218 initiates a redo pass, which uses the log file 220 records to repeat the transactions with respect to those object modifications that were logged, but whose effects were not stored in the database 204 on the DASD 110 before the failure. These transactions include even those that had neither committed nor reached the in-doubt state of a two-phase commit process by the time of the failure. The redo pass essentially reestablishes the state of the database 204 as of the time of the failure, as far as the events represented in the log file 220 records as of the time of the failure are concerned. However, the transaction control 218 will not redo log file 220 records that pertain to granules that appear in the GAL with an LSN less than the corresponding GAL LSN.

The next pass performed by the transaction control 218 is the undo pass, during which all modifications to objects that were in-progress but uncommitted at the time of the failure (so-called "in-flight" transactions) are rolled back, in reverse chronological order, in a single sweep of the log file 220 records. This is done by continually taking the maximum of the LSN of the next log file 220 record to be processed for each of the yet-to-be-completely-undone transactions, until no transaction remains to be undone. Note that for those transactions which were already rolling back at the time of the crash, the present invention will rollback only those modifications that had not already been undone.

Except for the changes noted herein, restart processing is performed as described in C. Mohan, D. Haderle, B. Lindsay, H. Pirahesh, and P. Schwarz, "ARIES: A Transaction Recovery Method Supporting Fine-Granularity Locking and Partial Rollbacks Using Write-Ahead Logging," ACM Transactions on Database Systems, Vol. 17, No. 1, March, 1992, which publication is incorporated by reference herein.

At this point, the database 204 has been recovered, to the best of the ability of the transaction control 218. Thereafter, the database 204 may be used for normal processing, with logging in effect.

Flowcharts

FIGS. 4A, 4B, 4C, 4D, 4E, 4F, and 4G together are flowcharts that further illustrate the operation of the transaction control 218 according to the present invention. Of course, those skilled in the art will recognize that this specific sequence of steps is for illustrative purposes only, and that other steps could be performed without departing from the scope of the present invention.

Figure 4A:
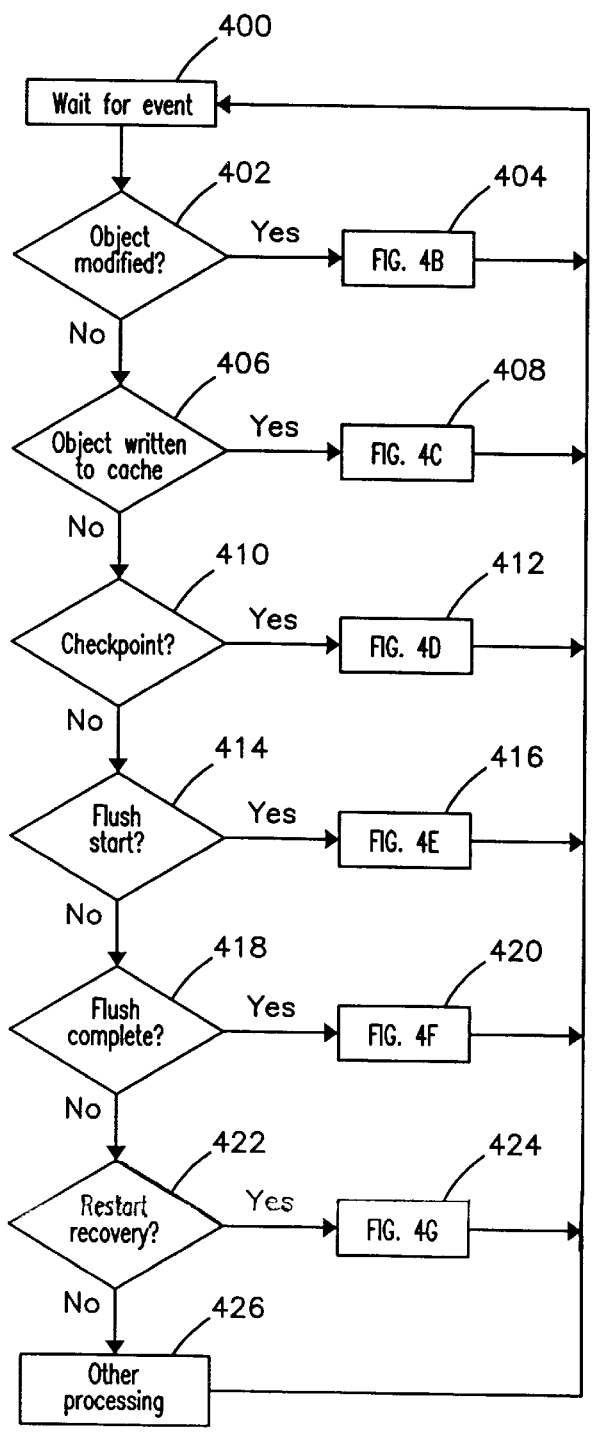
FIGS. 4A, 4B, 4C, 4D, 4E, 4F, and 4G together are flowcharts that further illustrate the operation of the transaction control according to the present invention.

FIG. 4A is a flowchart of the operation of the transaction control 218 according to the present invention.

Block 400 represents the transaction control 218 waiting for the next event to occur. Thereafter, control transfers to Blocks 402–426.

Block 402 represents the transaction control 218 determining whether a notification that an object is being modified was received. Generally, this notification is generated by instructions inserted into the NOTES® product wherever an object may be modified. Upon such an event, control transfers to Block 404, which is further defined in FIG. 4B, and then back to Block 400.

Block 406 represents the transaction control 218 determining whether an object has been written to the file cache 224. Generally, this notification is generated by instructions inserted into the NOTES® product wherever an object may be written to the file system 222. Upon such an event, control transfers to Block 408, which is further defined in FIG. 4C, and then back to Block 400.

Block 410 represents the transaction control 218 determining whether a checkpoint event occurred. Generally, checkpoints occur after a specified period of time or on the occurrence of a specified event (e.g., some number of log file 220 records being generated). Upon such an event, control transfers to Block 412, which is further defined in FIG. 4D, and then back to Block 400.

Block 414 represents the transaction control 218 determining whether a flush for the file cache 224 will start. Generally, the transaction control 218 is provided notice before the flush begins. Upon such an event, control transfers to Block 416, which is further defined in FIG. 4E, and then back to Block 400.

Block 418 represents the transaction control 218 determining whether a flush for the file cache 224 has completed. Upon such an event, control transfers to Block 420, which is further defined in FIG. 4F, and then back to Block 400.

Block 422 represents the transaction control 218 determining whether a restart recovery event occurred. Generally, a restart recovery occurs after a failure of some kind and usually only in response to an operator entry (although automated recovery may be used as well). Upon such an event, control transfers to Block 424, which is further defined in FIG. 4G, and then back to Block 400.

Finally, Block 426 represents the transaction control 218 performing other processing, after which control transfers back to Block 400.

Figure 4B:
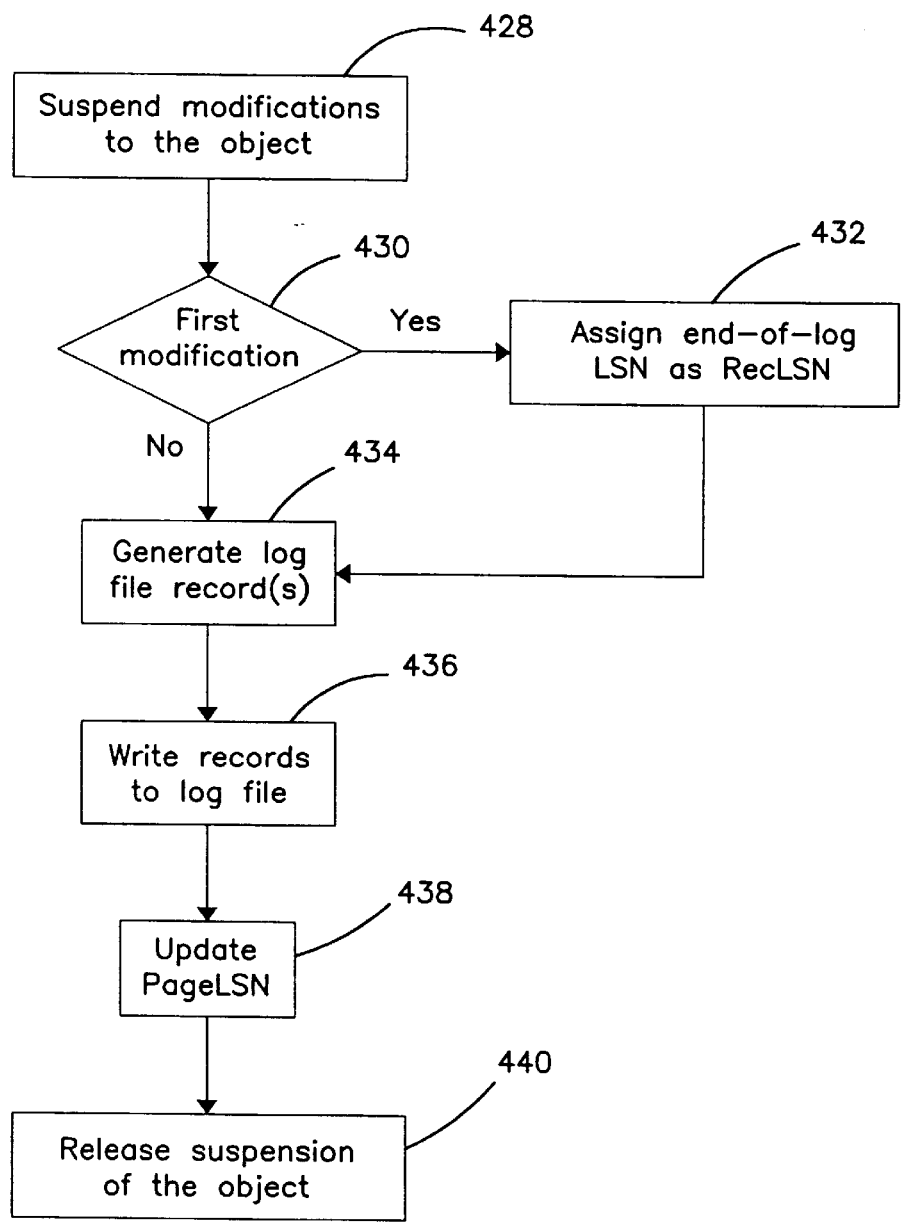

FIG. 4B is a flowchart of the operation of the transaction control 218 when it is notified that an object is being modified.

Block 428 represents the suspension of modifications to the object by any other transaction until the current transaction performs its update and generates the log file 220 record. Generally, such suspension is occurs as a matter of course through the interaction of the transaction control 218 and other components of the NOTES® product, e.g., the other component waits for an acknowledgment from the transaction control 218 before proceeding further in its modifications of the object or writing of the object to the file system 222.

Block 430 is a decision block that represents the transaction control 218 determining whether this is the first modification of the object. If so, control transfers to Block 432 to assign the end-of-log LSN as the object's RecLSN; otherwise, control transfers to Block 434.

Block 434 represents the transaction control 218 generating one or more log file 220 records for the modifications being made to the object using the object's RecLSN.

Block 436 represents the transaction control 218 writing the log file 220 records to the log file 220 on the DASD 110.

Block 438 represents the transaction control 218 update the object's PageLSN with the object's RecLSN.

Block 4440 represents the release of the suspension of modifications to the object made in Block 424. Generally, such a release occurs through the interaction of the transaction control 218 and other components of the NOTES® product, e.g., the transaction control 218 responds to the other component with an acknowledgment thereby allowing the other component to proceed in its modifications of the object.

Figure 4C:
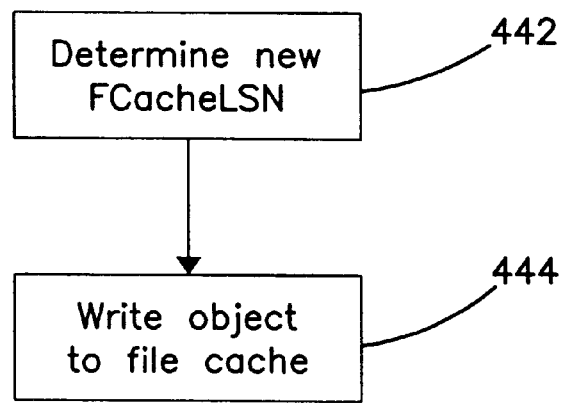

FIG. 4C is a flowchart of the operation of the transaction control 218 when it is notified that an object is being written to the file cache 224.

Block 438 represents the transaction control 218 determining the FCacheLSN by taking the minimum value for the RecLSNs of all objects that are suspected to be in the file cache 224, i.e., a minimum value for the RecLSNs of objects written to the file cache 224 since the last flush of the file cache 224.

Block 440 represents the transaction control 218 responding to the notification and indicating that the object can be written to the file cache 224.

Figure 4D:
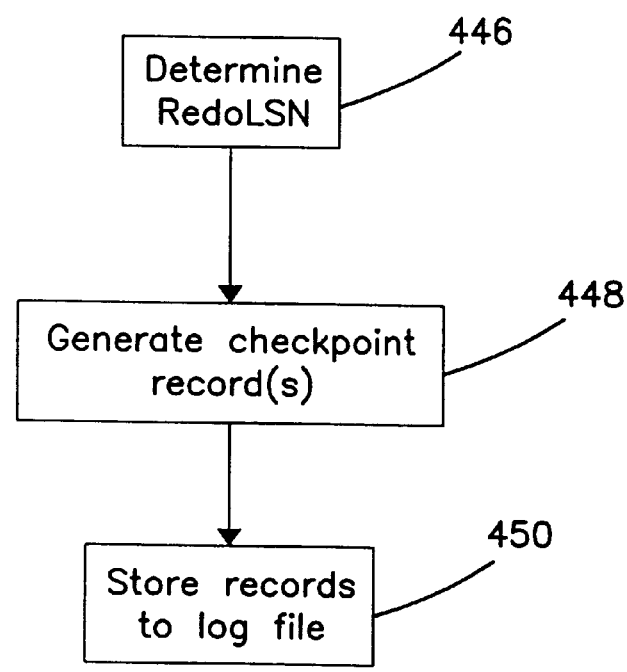

FIG. 4D is a flowchart of the operation of the transaction control 218 when a checkpoint event occurs.

Block 446 represents the transaction control 218 determining the ReDoLSN by taking the minimum value of the MinRecLSN, the FCacheLSN, and the TempFCacheLSN.

Block 448 represents the transaction control 218 generating one or more checkpoint records for the current state of the server 108. The checkpoint record contains the ReDoLSN and the list of active update transactions.

Block 450 represents the transaction control 218 storing the checkpoint records in the log file 220 on the DASD 110.

Figure 4E:
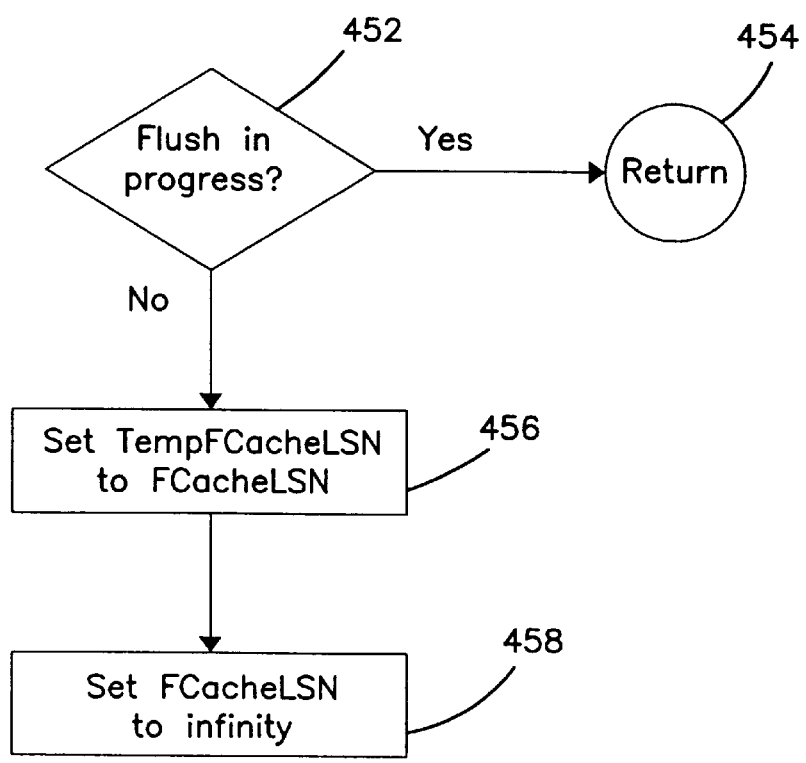

FIG. 4E is a flowchart of the operation of the transaction control 218 when a flush of the file cache 224 begins.

Block 452 represents the transaction control 218 determining whether a flush is already in progress, and if so, skips the operation by returning at 454.

Block 456 represents the transaction control 218 setting the TempFCacheLSN to the value of the FCacheLSN.

Block 458 represents the transaction control 218 setting the FCacheLSN to the value of infinity (i.e., the highest possible value).

Figure 4F:
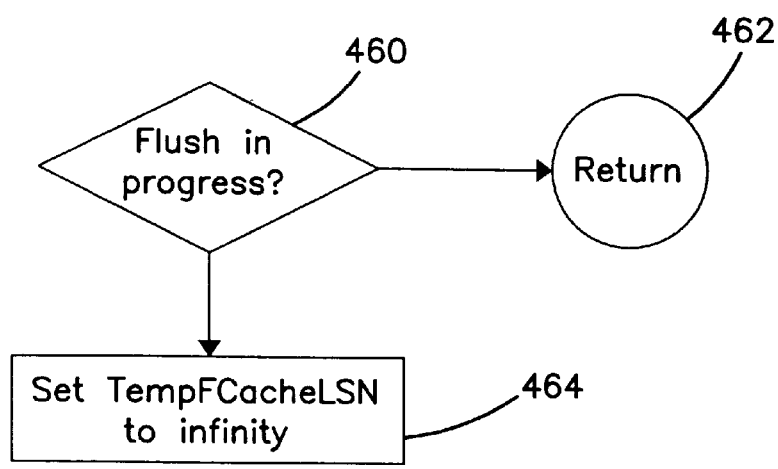

FIG. 4F is a flowchart of the operation of the transaction control 218 when a flush of the file cache 224 completes.

Block 460 represents the transaction control 218 determining whether any other flush is still in progress, and if so, it skips the operation by returning at 462.

Block 464 represents the transaction control 218 setting TempFCacheLSN to infinity (i.e., the highest possible value).

Figure 4G:
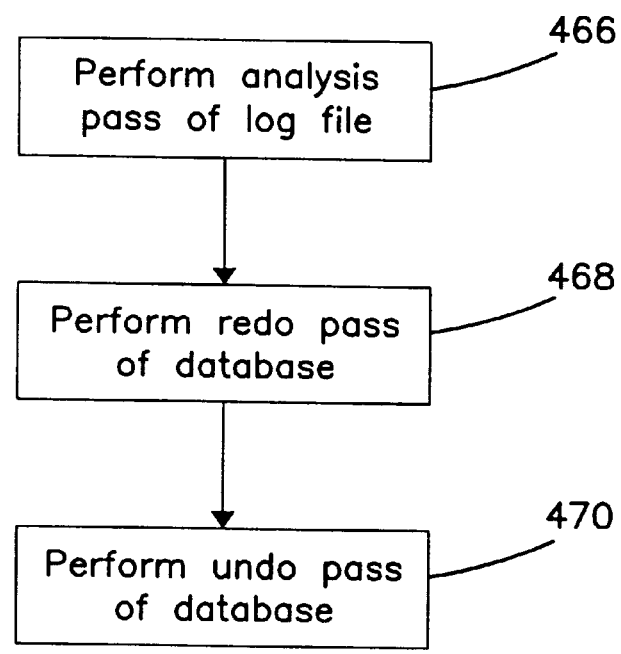

FIG. 4G is a flowchart of the operation of the transaction control 218 when a restart recovery method is requested. Generally, the restart recovery occurs only after a failure of some kind and usually only in response to an operator entry (although automated recovery may be used as well).

Block 466 represents the transaction control 218 performing an initial analysis pass, wherein the log file 220 records are scanned, starting from the restart redo as determined from the last checkpoint record to the end of the log file 220.

Block 468 represents the transaction control 218 performing a redo pass, wherein the log file 220 records are used to repeat the transactions with respect to those object modifications that were logged, but whose effects on the database 204 were not stored on the DASD 110 before the failure. This pass also starts from the same point where the analysis pass starts.

Block 470 represents the transaction control 218 performing an undo pass, wherein the log file 220 records representing all modifications to objects that were in-progress but uncommitted at the time of the failure (so-called "in-flight" transactions) are rolled back, in reverse chronological order.

Conclusion

This concludes the description of the preferred embodiment of the invention. In summary, the present invention comprises a method, apparatus, and article of manufacture for providing transaction control for a computer-implemented database management system. The database management system manages one or more databases, wherein each of the databases contains one or more documents, and each document contains one or more objects. The transaction control system uses write-ahead logging to guarantee the integrity of the database management system. Towards this end, the transaction control system monitors and controls the file cache to ensure that modified objects are stored on a data storage device in manner that reflects an accurate status for a log file maintained by the transaction control system.

The following describes some alternative ways of accomplishing the present invention. Those skilled in the art will recognize that different computer programming languages, database systems, operating environments, and operating systems could be substituted for those described herein. Those skilled in the art will recognize that the present invention could be used in any type of computer system, and need not be limited to a client-server architecture. Those skilled in the art will recognize that the present invention could be used with many types of databases, documents, and objects, and need not be limited to the example described herein. Those skilled in the art will recognize that alternate approaches to databases, documents, and objects could be substituted for the approach described herein without departing from the scope of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented database management system, comprising:

(a) a computer; and (b) a database management system, executed by the computer, for managing one or more databases, wherein the database management system supports a file cache for one or more of the databases and each of the databases contains one or more objects; and (c) a transaction control system, executed by the computer, for providing transaction control for the databases managed by the database management system, wherein the transaction control system monitors and controls the file cache to ensure that modified objects are stored on a data storage device a in manner that reflects an accurate status for a log file maintained by the transaction control system, the transaction control system tracks a state of the file cache identifying objects to be modified that are written to the file cache since the last flush.

2. The system of claim I above, wherein the transaction control system uses a write-ahead logging (WAL) protocol for recovery of the databases, such that records are stored in the log file before the modified objects are allowed to replace previous versions thereof in the database.

3. The system of claim 1 above, wherein each database opened by the database management system has an associated FCacheLSN.

4. The system of claim 3 above, wherein the FCacheLSN stores a conservative value which is a minimum RecLSN of all the objects of the database that may exist in the file cache.

5. The system of claim 3 above, further comprising means for set the FCacheLSN of a database to a highest possible value whenever the file cache's contents are flushed to a data storage device.

6. The system of claim 3 above, further comprising means for set the FCacheLSN of a database to a minimum possible value whenever a modified object is written to the file cache.

7. The system of claim 3 above, wherein each database opened by the database management system has an associated TempFCacheLSN.

8. The system of claim 7 above, wherein the FCacheLSN is set to a value of the FCacheLSN at a start of a flush operation.

9. The system of claim 7 above, wherein the FCacheLSN is set to a highest possible value at a completion of a flush operation.

10. The system of claim 1 above, wherein the transaction control system records a transaction in one or more records stored in the log file, each of the records is assigned a unique log sequence number (LSN), and the LSN is selected from a group comprised of (1) a PageLSN that identifies a version of an object, (2) a RecLSN that identifies a recovery version of an object, (3) a MinRecLSN that is a minimum value of all RecLSNs of a buffer pool, shared memory objects, and a dirty objects table, (4) a FCacheLSN that is a minimum value for the RecLSNs of all objects that are suspected to be in the file cache, and (5) a ReDoLSN that identifies a RecLSN in the log file where a restart recovery of the database should begin.

11. The system of claim 10 above, wherein the FCacheLSN is a minimum value for the RecLSNs of objects written to the file cache since a last flush of the file cache.

12. The system of claim 11 above, wherein a TempFCacheLSN is used to temporarily hold a copy of the FCacheLSN during a flush of the file cache.

13. The system of claim 10 above, wherein the dirty objects table contains RecLSNs for modified objects stored in the computer.

14. The system of claim 10 above, wherein the transaction control system further comprises means for analyzing the log file to create a granule avoidance list (GAL) from the log file.

15. The system of claim 14 above, wherein the GAL contains the LSNs of positions in the log file after which a redo operation is performed on corresponding granules.

16. The system of claim 15 above, further comprising means for skipping modifications reflected in the records that affect any granule listed in the GAL, except for modifications after a LSN in the GAL.

17. A method of transaction control for a computer-implemented database management system, comprising the steps of:

(a) managing one or more databases using a database management system, wherein the database management system supports a file cache for one or more of the databases and each of the databases contains one or more objects; and (b) providing transaction control for the databases managed by the database management system using a transaction control system, wherein the transaction control system monitors and controls the file cache to ensure that modified objects are stored on a data storage device a in manner that reflects an accurate status for a log file maintained by the transaction control system, the transaction control system tracking a state of the file cache identifying objects to be modified that are written to the file cache since the last flush.

18. A computer program carrier embodying one or more instructions readable by a computer that causes the computer to perform steps directed to a method of transaction control for a computer-implemented database management system, the method comprising the steps of:

(a) managing one or more databases using a database management system, wherein the database management system supports a file cache for one or more of the databases and each of the databases contains one or more objects; and (b) providing transaction control for the databases managed by the database management system using a transaction control system, wherein the transaction control system monitors and controls the file cache to ensure that modified objects are stored on a data storage device a in manner that reflects an accurate status for a log file maintained by the transaction control system, the transaction control system tracking a state of the file cache identifying objects to be modified that are written to the file cache since the last flush.

* * * * *